United States Patent
Gündogan

(10) Patent No.: US 11,975,763 B2
(45) Date of Patent: May 7, 2024

(54) DASHBOARD SUPPORT

(71) Applicant: Kirchhoff Automotive Deutschland GmbH, Attendorn (DE)

(72) Inventor: Aydogan Gündogan, Plettenberg (DE)

(73) Assignee: KIRCHHOFF AUTOMOTIVE DEUTSCHLAND GMBH, Attendorn (DE)

( * ) Notice: Subject to any disclaimer, the term of this patent is extended or adjusted under 35 U.S.C. 154(b) by 199 days.

(21) Appl. No.: 17/778,549

(22) PCT Filed: Nov. 20, 2020

(86) PCT No.: PCT/EP2020/082932
§ 371 (c)(1),
(2) Date: May 20, 2022

(87) PCT Pub. No.: WO2021/099589
PCT Pub. Date: May 27, 2021

(65) Prior Publication Data
US 2023/0039843 A1 Feb. 9, 2023

(30) Foreign Application Priority Data
Nov. 21, 2019 (DE) .................. 10 2019 131 425.9

(51) Int. Cl.
*B62D 25/14* (2006.01)
(52) U.S. Cl.
CPC .................. *B62D 25/145* (2013.01)
(58) Field of Classification Search
USPC ............. 296/70, 72, 193.01, 193.02
See application file for complete search history.

(56) References Cited

U.S. PATENT DOCUMENTS

| 6,921,128 B2* | 7/2005 | Davis, Jr. ............. B62D 25/145 296/187.05 |
| 7,152,295 B2* | 12/2006 | Goetz .................... B62D 25/14 296/72 |

(Continued)

FOREIGN PATENT DOCUMENTS

| CN | 203920925 U | 11/2014 |
| DE | 19808615 A1 * | 8/1998 ............. B60K 37/00 |

(Continued)

OTHER PUBLICATIONS

International Search Report dated Feb. 24, 2021 in parent international application PCT/EP2020/082932.

(Continued)

*Primary Examiner* — Amy R Weisberg
*Assistant Examiner* — Veronica M Shull
(74) *Attorney, Agent, or Firm* — Polson Intellectual Property Law, PC; Margaret Polson; Christopher Sylvain

(57) ABSTRACT

A dashboard support for a motor vehicle to be installed between and connected to two pillars located on opposite vehicle sides. The dashboard support has a support structure provided by a hollow profile, which support structure has at least one support portion having a curvature. A planar reinforcement part spanning this curved support portion on the inside of the curvature is arranged on the outside of the support structure. The planar extension of the reinforcement part faces toward the curvature and the ends of the reinforcement part facing in the spanning direction are connected to the outer surface of the support structure.

14 Claims, 3 Drawing Sheets

(56) References Cited

U.S. PATENT DOCUMENTS

| | | | | |
|---|---|---|---|---|
| 8,220,857 | B2 * | 7/2012 | Baudart | B62D 25/145 296/72 |
| 8,317,256 | B2 * | 11/2012 | Da Costa Pito | B62D 25/145 296/70 |
| 8,950,794 | B2 | 2/2015 | Lenkenhoff | |
| 9,446,799 | B2 | 9/2016 | Franzpötter | |
| 9,598,100 | B2 | 3/2017 | Lenkenhoff | |
| 9,764,764 | B2 | 9/2017 | Irle | |
| 10,005,495 | B2 | 6/2018 | Töller | |
| 10,577,025 | B2 | 3/2020 | Michler | |
| 10,882,559 | B2 | 1/2021 | Gündogan | |
| 11,142,248 | B2 | 10/2021 | Günther | |
| 11,148,623 | B2 | 10/2021 | Günther | |
| 11,235,720 | B2 | 2/2022 | Höning | |
| 11,292,409 | B2 | 4/2022 | Töller | |
| 11,505,146 | B2 | 11/2022 | Weige | |
| 2005/0140161 | A1 * | 6/2005 | DeLong | B60K 37/00 296/78.1 |
| 2019/0344385 | A1 | 11/2019 | Töller | |
| 2022/0009435 | A1 | 1/2022 | Günther | |
| 2022/0024399 | A1 | 1/2022 | Tlauka | |
| 2022/0258684 | A1 | 8/2022 | Günther | |
| 2022/0281532 | A1 | 9/2022 | Tentscher | |
| 2022/0289304 | A1 | 9/2022 | Weige | |
| 2022/0297524 | A1 | 9/2022 | Günther | |
| 2022/0314912 | A1 | 10/2022 | Töller | |
| 2022/0363211 | A1 | 11/2022 | Günther | |

FOREIGN PATENT DOCUMENTS

| | | | | |
|---|---|---|---|---|
| DE | 19808615 | A1 | | 8/1998 |
| DE | 29916467 | U1 | | 12/1999 |
| DE | 10023506 | A1 | | 10/2001 |
| DE | 102006044699 | A1 * | 4/2008 | ........... B62D 25/145 |
| DE | 102006044699 | A1 | | 4/2008 |
| DE | 202011110441 | U1 | | 1/2014 |
| DE | 102013102292 | A1 | | 9/2014 |
| DE | 102016207765 | A1 | | 11/2017 |
| EP | 1560724 | A1 | | 5/2004 |
| FR | 2667038 | A * | 3/1992 | ............... B62D 1/16 |
| WO | 2012070328 | A1 | | 5/2012 |

OTHER PUBLICATIONS

Written Opinion of the International Searching Authority dated Feb. 24, 2021 in parent international application PCT/EP2020/082932.
Pending U.S. Appl. No. 17/637,398, filed Feb. 22, 2022, applicant Kirchhoff Automotive Deutschland GmbH. Per MPEP 609.07, not provided as this is available in the USPTO system.
Pending U.S. Appl. No. 17/635,487, filed Feb. 15, 2022, applicant Kirchhoff Automotive Deutschland GmbH. Per MPEP 609.07, not provided as this is available in the USPTO system.
Examination report dated May 30, 2023 in related Chinese application No. 202080088618.1.
Examination report dated Oct. 29, 2023 in related Chinese application No. 202080088618.1.

* cited by examiner

DASHBOARD SUPPORT

BACKGROUND

The present disclosure relates to a dashboard support for a motor vehicle, to be installed between and connected to two pillars located on opposite vehicle sides, having a support structure provided by a hollow profile, which support structure has at least one support portion having a curvature.

Dashboard supports are used to attach instruments and the steering connection in a motor vehicle. Dashboard supports are installed between two pillars, typically the A-pillars, of a motor vehicle. To connect such a dashboard support, it is provided with corresponding mechanical connection elements at its distal ends. A dashboard support may also be referred to as a dashboard carrier or an instrument panel support or carrier.

A key component of such a dashboard support is a support structure. The support structure extends between the pillars. Connections for instruments and for further fixing points relative to the vehicle can be provided on the support structure, for example floor supports by which the support structure is supported by the floor of the vehicle, typically in the region of its tunnel. In many cases, the support structure has curvatures in order to provide a necessary offset of parts of the support structure transverse to the longitudinal extension of the support structure. As a result, the central portion of the transverse support structure is U-shaped, with the two legs of this shape typically being inclined toward one another in a V-shape. Such a shape is required, for example, in a central portion of the support structure in order to provide installation space for certain units, such as the air conditioning system. Such a dashboard support is known from FIG. 1 of DE 10 2006 044 699 A1.

Another dashboard support is known from DE 10 2013 102 292 A1. This dashboard support uses an extruded holding profile made of a light metal alloy, with which a support portion is gripped. The extruded holding profile is used to provide a connection point for attaching accessories.

Dashboard supports are also known from DE 100 23 506 A1 and DE 10 2016 207 765 A1. The support structure of these previously known dashboard supports has a straight configuration.

Vibrations or impacts introduced into the dashboard support during driving are problematic, in particular via the steering connection or via the connection to the pillars of the vehicle. These vibrations and impacts can affect the stability of a dashboard support as well as excite the dashboard support itself to vibrate. However, this is undesirable. In order to keep the vibrations of the dashboard support low, it is known from the prior art to provide the support structure with increased material thicknesses or to fix it at additional points on the motor vehicle. The connection is thus stiffened, so that the support structure can be supported on the motor vehicle structure. In these previously known solutions, however, the additional weight due to the increased material thicknesses or the additional connections and the resulting reduced installation space for instruments or units is perceived as disadvantageous.

SUMMARY

Proceeding from this background, an aspect of the present disclosure is to develop a dashboard support of the type mentioned at the outset, so that it is less sensitive to vibrations and impacts, and wherein it should have the smallest possible installation space and the lowest possible weight.

This is achieved by a dashboard support of the type mentioned at the outset, in which a planar reinforcement part spanning the curved support portion on the inside of the curvature is arranged on the outside of the support structure, in the manner of a chord, over the curved support portion, wherein the planar extension of the reinforcement part points toward the curvature and the ends of the reinforcement part pointing in the spanning direction are connected to the outer surface of the support structure. Advantageous aspects and embodiments will be apparent from the description and claims.

The support structure is reinforced in the region of its curved support portion by a reinforcement part. The reinforcement part spans the curvature of the curved support portion and is connected to the outer surface of the support structure on the outside with its ends pointing in the spanning direction. The reinforcement part is thus connected to the support structure on the side compressed by the curvature. When a compressed or stretched side is mentioned in these explanations, this does not necessarily mean that the support structure has to be compressed and/or stretched by deformation in order to form the at least one curved portion. However, this will be usually the case when the support structure is brought into shape by forming. It is also possible that the curved portion support portion is cast, for example. It is also possible to design the support structure as a shell component, composed of two or more shells. When assembled, these then form the hollow profile of the support structure. The reinforcement part is arranged opposite the curved support portion in the manner of a chord and thus at least partially spans the curved support portion.

The reinforcement part is a planar element, for example a metal sheet. The planar extension thereof points toward the inside of the curvature of the curved support portion. The longitudinal extent of the reinforcement part, which is designed as sheet metal, thus follows the spanning direction of the curved support portion.

The ends of the reinforcement part pointing in the spanning direction are connected to the outer surface of the support structure. According to a preferred example embodiment, this is provided by means of a material connection, typically by means of a welded connection. The reinforcement part increases the effective diameter in the region of the curvature. The effective diameter is the maximum distance between two connected surfaces, whereby a section modulus is provided by the connection or support of the surfaces against one another. This is all the greater, the greater the distance between the surfaces, and therefore the effective diameter. The effective diameter, which is increased compared to the diameter of the curved support portion, therefore effectively prevents vibration amplification by the curved support portion. By arranging the reinforcement part on the inside of the curve and by spanning the curved support part, the effective diameter in the region spanned by the reinforcement part extends from this region to the outer surface portion of the curved support portion opposite the reinforcement part. This provides greater mechanical leverage against a vibration or shock in the curvature. In addition, due to its planar extension in the direction of the center line of curvature, the reinforcement part provides an additional section modulus against forces that act in this direction. The reinforcement part thus acts as a parallel belt that stabilizes the curved inner side of the curved support portion. This interaction significantly improves the stiffness of the curved support portion and thus of the support structure, both in relation to a movement that bends the curvature by opening or closing the same and in relation to a movement that twists the curved support portion. The support structure is inherently stiffened in the region in which the reinforcement part is arranged, so that an independent oscillation of the support structure is counteracted, specifically without the need for additional supports on the vehicle side.

In a preferred embodiment, the reinforcement part additionally has at least one connection portion with which it is connected to the neutral line of the curved support portion, typically in a materially bonded manner by welding. The neutral line of the curved support portion is the line or plane that represents the transition from the inside of the curve to the outside of the curve, and consequently in which the material is neither compressed nor stretched. An additional reinforcement is also provided by such a connection portion, since the reinforcement part is additionally supported along its longitudinal extent on the curved support portion. The connection portion is typically provided by a leg that is bent from the planar extension of the reinforcement part. A further improvement can be achieved if the reinforcement part has two connection portions, so that the reinforcement part then has a U-shaped cross-sectional geometry. The two connection portions are connected to the neutral line of the curved portion with their end pointing away from the planar region of the reinforcement part.

A further development provides that the connection portion extends over the entire curved portion along the neutral line. As a result, the planar reinforcement part can be supported not only in relation to the curved support portion, but the reinforcement part is additionally reinforced in the direction of the radius of curvature by the connection portion that is flared out in relation to the planar extension. In this way, the reinforcement part needs to be connected to the curved support portion with its at least one connection part along the neutral line only at individual points, for example in the form of a stitched or step weld seam.

In one embodiment, the reinforcement part has an elongate embossing, typically in the manner of a bead, which rises from the planar extension. The longitudinal direction of this embossing is in the spanning direction. By introducing an embossing, the reinforcement part is stiffened in the direction of the radius of curvature, so that buckling or bulging of the reinforcement part is effectively prevented.

The support structure is provided by a hollow profile. This can be a multi-shell profile with a round or angular cross-sectional geometry. In one configuration, at least the curved support portion is a tube, typically a round tube, namely a tube with a curved outer surface, in order to simplify processing, in particular for forming the curvature. This can be circular or oval. For weight and manufacturing reasons, a preferred embodiment provides for the entire support structure to be provided by a tube.

If the curved support portion is tubular, the reinforcement part has at least one connection recess pointing towards the tube for connecting it to the outer surface of the support structure, which is adapted in terms of its outline geometry to the geometry of the outer surface of the tube. The width of the reinforcement part on its narrow side preferably corresponds to the diameter of the curved support portion. It is also quite possible that the extension of the narrow side of the reinforcement part is somewhat smaller or also larger than the diameter of the curved support portion. If the height of the reinforcement part, namely its extension in the direction of the narrow side, corresponds to the diameter of the curved support portion, the connection recesses are designed in such a way that they are connected to those of the support structure over half the circumference.

In a further embodiment it is provided that at least parts of the end portions of the reinforcement part connected to the outer surface of the support structure are arranged on the support structure outside of the support portion. As a result of this measure, the spanning distance is increased, and the curved support portion as a whole is therefore spanned by the reinforcement part. If the support structure is a round tube, the crests of the end recesses of the reinforcement part are located at the boundary in the transition from the straight support portion adjacent to the curved support portion to the curved support portion or are only a short distance away from this portion, outside of the curved support portion. The stiffening effected in this way turns out to be sufficient. A greater distance in the region of the center of the reinforcement part relative to the neutral lines of the curved support portion is possible, but requires more installation space without any improvement in terms of vibration prevention.

BRIEF DESCRIPTION OF THE DRAWINGS

The present disclosure is described below on the basis of example embodiments with reference to the figures, wherein.

DETAILED DESCRIPTION

Figure 1:
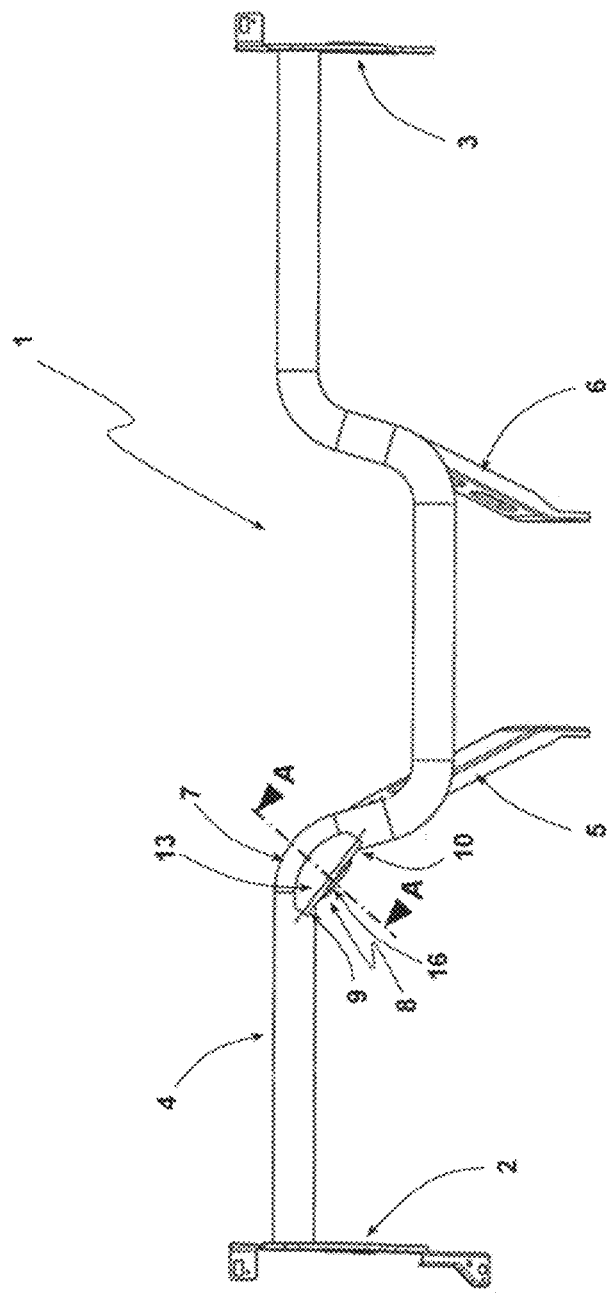
FIG. 1 shows a dashboard support with a reinforcement part according to a first embodiment.

FIG. 1 shows a dashboard support 1 for a motor vehicle. It is intended that the dashboard support is connected to the A-pillars of a motor vehicle between two opposite sides of the vehicle by means of connection elements 2, 3. The dashboard support 1 has a support structure 4. The support structure 4 is a hollow profile. In the illustrated embodiment, the support structure 4 is a round tube. In addition to the two connection elements 2, 3 connected at the ends to the support structure 4, the support structure 4 carries floor supports 5, 6, with which the support structure 4 is connected in its central portion to a floor of a motor vehicle, not shown in detail.

The support structure 4 has a curvature in a curved support portion 7. The support portion 7 together with other curved and straight support portions (not designated in more detail) forms a U-shape located in the central region of the support structure. In the illustrated embodiment, the dashboard support 1 is provided for a left-hand drive motor vehicle. A steering column, not shown in detail, is connected to the dashboard support 1 or its support structure 4 between the connection element 2 and the curved portion 7.

Figure 2:
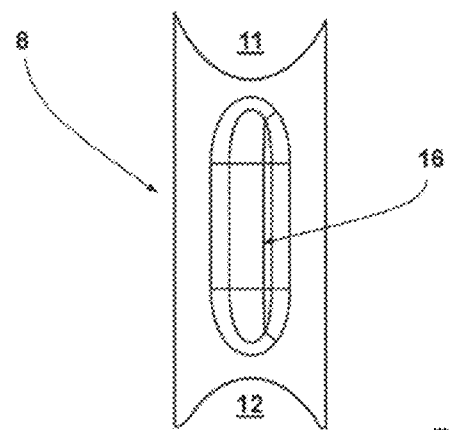
FIG. 2 shows the reinforcement part of FIG. 1 in a front view.

On the outside of the support structure 4 there is a reinforcement part 8 spanning the curved support portion 7 on the inside. The reinforcement part 8 is arranged opposite the curved support portion 7 on the inside of the curvature in the manner of a chord. The reinforcement part 8 is connected to the curved outer surface of the support structure 4 with its ends 9, 10 pointing in the spanning direction. For this purpose, the reinforcement part 8 has connection recesses 11, 12, which can be seen in FIG. 2. These are adapted to the cross-sectional geometry of the round tube forming the support structure 4 and thus also to its diameter. They are materially connected along their contact surface to the outer surface of the support structure 4 designed as a round tube.

The reinforcement part 8 also has connection portions, with only the upper connection portion 13 being visible in FIG. 1. The second connection portion 14 can be seen in the sectional view of FIG. 3. From the sectional representation of FIG. 3, it can also be seen that the connection portions 13, 14 reach up to the neutral line 15 (wherein the longitudinal plane through the curved support portion is at right angles to the direction of curvature). In the region of the neutral line 15, the ends of the connection portions 13, 14 are materially connected to the curved support portion by welding. With regard to the connection of the connection portions 13, 14 to the curved support portion, the neutral line 15 is the upper or lower vertex of the round tube shown in FIG. 3 and represents the transition from the inside of the curve (where the reinforcement part 8 is located) to the outside of the curve. An intermittent or interrupted weld seam, also known as a stitched or step weld seam, is sufficient for connecting the support portions 13, 14 to the support portion 7.

The reinforcement part 8 also has a bead-like embossing 16. This rises from the planar extent of the reinforcement part 8, in this case pointing away from the curved support portion 7, and points with its longitudinal direction in the spanning direction (see also FIGS. 1 and 2).

Figure 3:
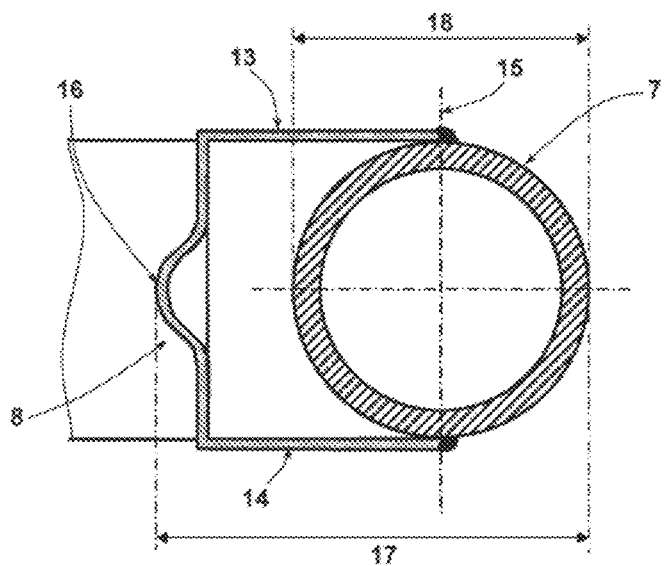
FIG. 3 shows a cross section through the dashboard support of FIG. 1 taken along the line A-A of FIG. 1.

As can be seen in FIG. 3, the reinforcement part 8 increases the effective diameter 17 in the direction of curvature of the curved support part 7 compared to the actual diameter 18 of the support portion 7. As a result, the section modulus of the tube cross section is significantly increased, which effectively prevents an opening or closing bending movement of the curvature caused by the forces in question. In addition, due to the planar extension of the reinforcement part 8 in the direction of the center line of curvature, the section modulus is also increased in this direction. It is clear from the sectional view in FIG. 3 that the reinforcement part 8 has a height or an extent in the direction of its narrow sides that corresponds to the diameter 18 of the support portion 7. By increasing the section modulus in this arrangement, vibration is prevented; the provided support structure 4 is thus effectively stiffened.

Figure 4:
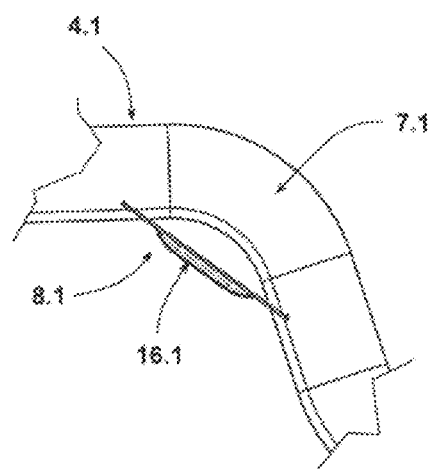
FIG. 4 shows a dashboard support with a reinforcement part according to a second embodiment.

FIG. 4 shows a detail of another dashboard support 1, which in principle corresponds to the dashboard support 1 of the preceding figures. In the detail shown in FIG. 4, the curved support portion 7.1 is spanned by another reinforcement part 8.1 and is thus stiffened. In contrast to the reinforcement part 8, the reinforcement part 8.1 does not have connection portions. It can be clearly seen in this figure that the reinforcement part 8.1 spans the curved support portion 7.1 on the inside of the curvature. It is connected with its ends 9.1, 10.1 pointing in the spanning direction before the beginning of the curved support portion 7.1 to the outer surface of the support structure 4.1, also with a material connection. The welding seam is not shown in this figure. The above-mentioned advantages with regard to the increase in the section modulus are also achieved by this configuration. If the extension in the spanning direction is sufficiently short, the embossing 16.1, which is identical to the previously described, can be sufficient to stiffen the reinforcement part in order to sufficiently increase the section modulus also transversely to the planar extension of the reinforcement part 8.1.

The invention has been described on the basis of example embodiments. Without departing from the scope of protection described by the claims, numerous further ways and embodiments for implementing the subject matter of the invention are apparent to a person skilled in the art, without these having to be explained or shown in more detail within the context of this disclosure.

LIST OF REFERENCE NUMERALS

1 dashboard support
2, 3 connection element
4, 4.1 support structure
5, 6 floor supports
7, 7.1 curved support portion
8, 8.1 reinforcement part
9, 9.1, 10, 10.1 ends of the reinforcement part
11, 12 connection recess
13, 14 connection portion
15 neutral line
16, 16.1 embossing
17 effective diameter
18 diameter

The invention claimed is:

1. A dashboard support for a motor vehicle, configured to be installed between and connected to two pillars located on opposite vehicle sides, comprising:
   a support structure provided by a hollow profile, wherein the support structure has at least one curved support portion with a curvature, and one end of the curved support portion is offset transversely to a longitudinal extent of the support structure relative to the other end of the curved support portion, such that an offset of portions of the support structure transversely to the longitudinal extent of the support structure is provided, and
   a reinforcement part arranged on the support structure, wherein the reinforcement part spans the curved support portion on the inside of the curvature in the manner of a chord, a planar extension of the reinforcement part faces toward the curvature, and ends of the reinforcement part facing in the spanning direction are connected to the outer surface of the support structure.

2. The dashboard support of claim 1, wherein at least the curved support portion of the support structure is a tube.

3. The dashboard support of claim 2, wherein the tube is a round tube.

4. The dashboard support of claim 2, wherein the reinforcement part has at least one connecting recess facing towards the tube with a shape adapted to a geometry of the outer surface of the tube.

5. The dashboard support of claim 4, wherein the shape of the connecting recess is complementary to the geometry of the outer surface of the tube.

6. The dashboard support of claim 1, wherein at least parts of the ends of the reinforcement part connected to the outer surface of the support structure are arranged outside the curved support portion along the support structure.

7. The dashboard support of claim 1, wherein the reinforcement part additionally has at least one connection portion with which the planar extension of the reinforcement part is connected to at least one neutral line of the curved support portion.

8. The dashboard support of claim 7, wherein the at least one connection portion extends along the neutral line over the entire curved support portion.

9. The dashboard support of claim 1, wherein the reinforcement part is materially connected to the support structure.

10. The dashboard support of claim 1, wherein the reinforcement part has an elongate embossing which rises from the planar extension of the reinforcement part, and a longitudinal direction of the elongate embossing points in the spanning direction of the reinforcement part.

11. The dashboard support of claim 10, wherein the elongate embossing points away from the curved support portion with regard to an embossing direction of the elongate embossing.

12. The dashboard support of claim 1, wherein the entire support structure is a round tube.

13. The dashboard support of claim 1, wherein connecting elements for connecting the dashboard support to A-pillars of the vehicle are connected to respective ends of the support structure.

14. The dashboard support of claim 1, wherein the dashboard support is only provided with the reinforcement part spanning the curved support portion on a side of the support structure to which a steering column is connected.

* * * * *